United States Patent [19]

Miller

[11] Patent Number: 4,521,683

[45] Date of Patent: Jun. 4, 1985

[54] PRESSURE-ACTUATED OPTICAL SWITCH

[75] Inventor: Glen E. Miller, Redondo, Wash.

[73] Assignee: The Boeing Company, Seattle, Wash.

[21] Appl. No.: 245,719

[22] Filed: Mar. 20, 1981

[51] Int. Cl.³ ............................................. G01D 5/30
[52] U.S. Cl. ..................................... 250/221; 73/705;
73/715; 250/231 R; 250/231 P; 374/161
[58] Field of Search ................... 250/221, 229, 231 R,
250/231 P, 227; 73/705, 715, 717, 723; 340/365
P; 374/205, 19, 143, 161

[56] References Cited

U.S. PATENT DOCUMENTS

| | | |
|---|---|---|
| 1,448,240 | 3/1923 | Spencer . |
| 1,766,965 | 6/1930 | Thomas . |
| 1,823,319 | 9/1931 | Dickinson . |
| 3,040,583 | 6/1962 | Post ........................................ 73/705 |
| 3,215,135 | 11/1965 | Franke ............................. 73/705 X |
| 3,249,105 | 5/1966 | Polanyi . |
| 3,273,447 | 9/1966 | Frank ............................... 73/715 X |
| 3,387,494 | 6/1968 | Golay . |
| 3,503,116 | 3/1970 | Strack . |
| 3,509,767 | 5/1970 | Greer . |
| 3,580,082 | 5/1971 | Strack ............................. 73/715 X |
| 3,590,640 | 7/1971 | Cindrich ......................... 73/715 X |
| 3,796,393 | 3/1974 | Beistle ........................ 250/231 P X |
| 4,013,342 | 3/1977 | Nardony ..................... 340/365 P X |
| 4,049,935 | 9/1977 | Gruber .............................. 73/717 X |
| 4,158,310 | 6/1979 | Ho ............................. 250/231 P X |

FOREIGN PATENT DOCUMENTS 578172 7/1976 Switzerland ........................... 73/705

Primary Examiner—David C. Nelms
Assistant Examiner—Edward P. Westin
Attorney, Agent, or Firm—Schwartz, Jeffery, Schwaab, Mack, Blumenthal & Koch

[57] ABSTRACT

An optical switching element utilizes a spherical diaphragm mounted for snap-action movement between a concave and convex shape. A light beam is directed through a small aperture to impinge on the diaphragm. The aperture is positioned at a distance from the diaphragm equal to the radius of curvature of the diaphragm to obtain maximum reflection of the light when the diaphragm is in its concave shape. Upon movement of the diaphragm to the convex shape in response to an external stimuli, substantially all of the light is absorbed within the supporting housing with little or no light being reflected through the small aperture. The presence or absence of the light beam thus provides an indication of the external condition which may be a temperature value, pressure value or the like. The switch may also be utilized as a mechanical limit switch or a plurality of such optical switches may be fabricated to form a keyboard for entry of data into a computing system.

36 Claims, 22 Drawing Figures

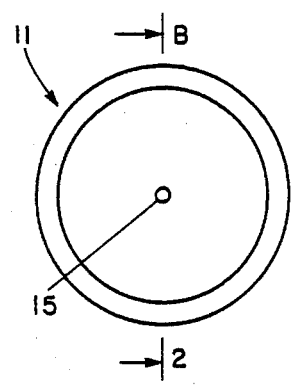
FIG. 1A
FIG. 1B
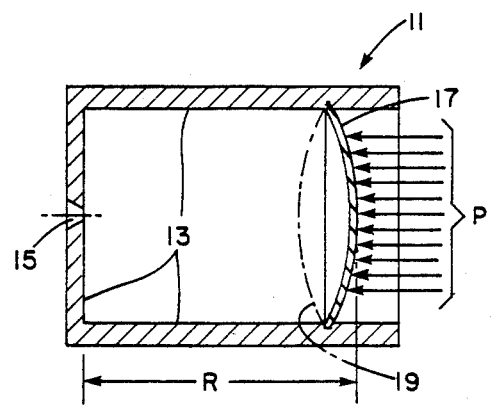
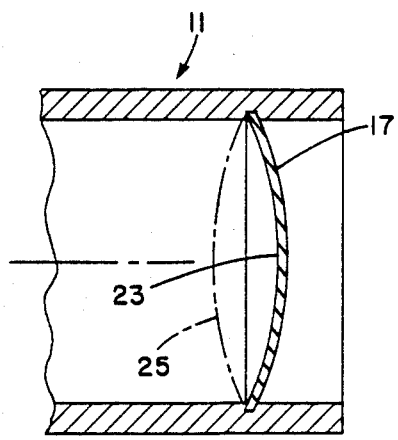
FIG. 2
FIG. 3
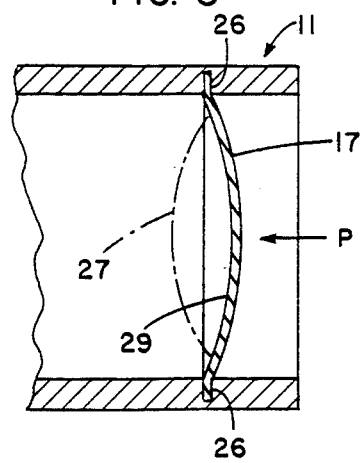

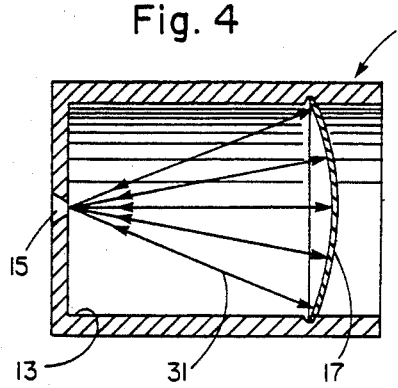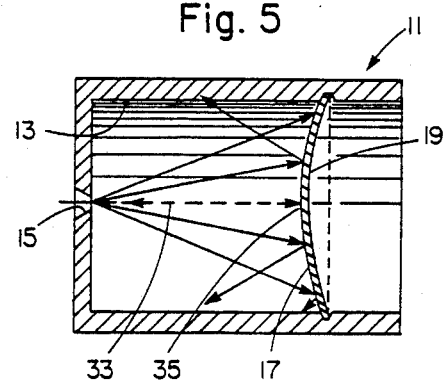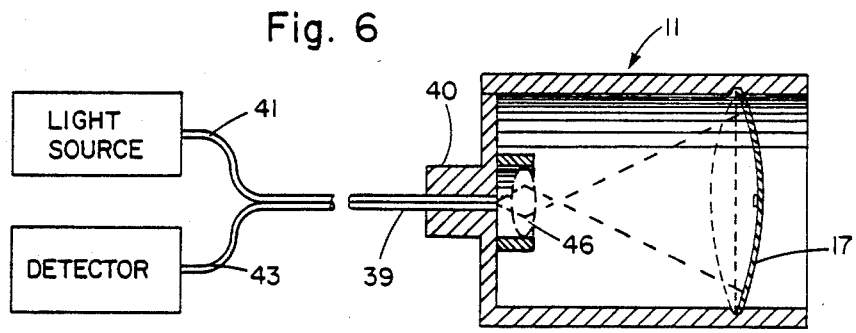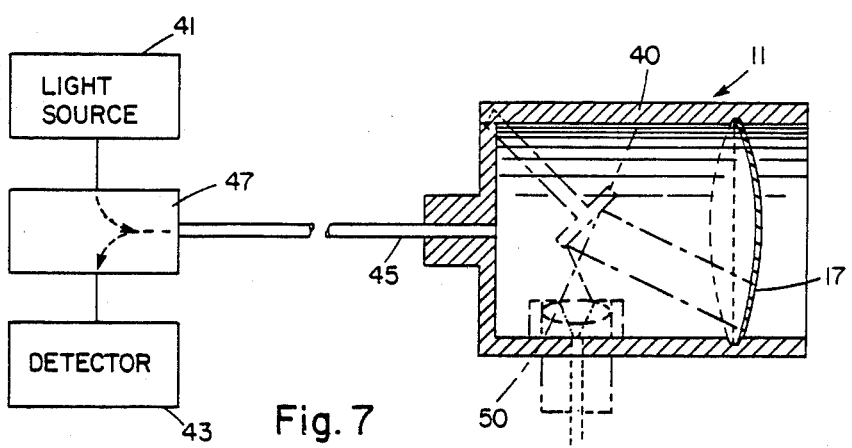

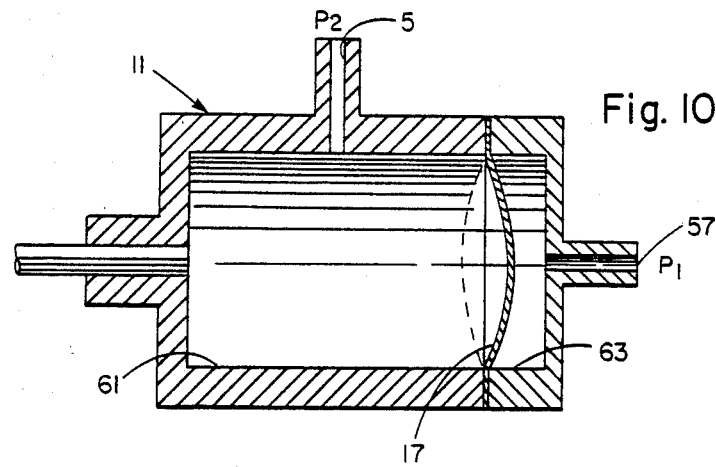
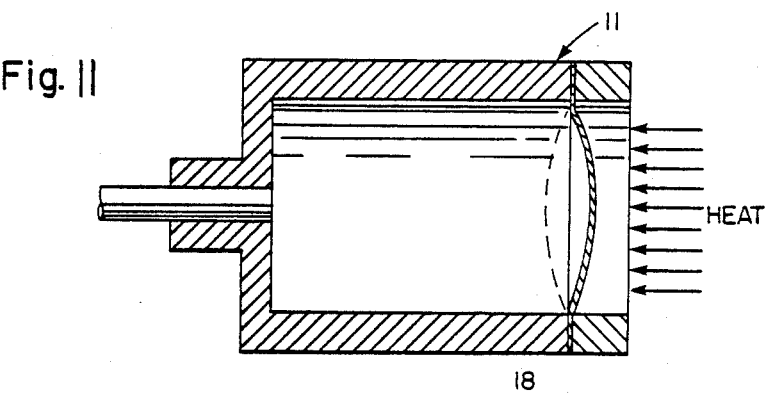
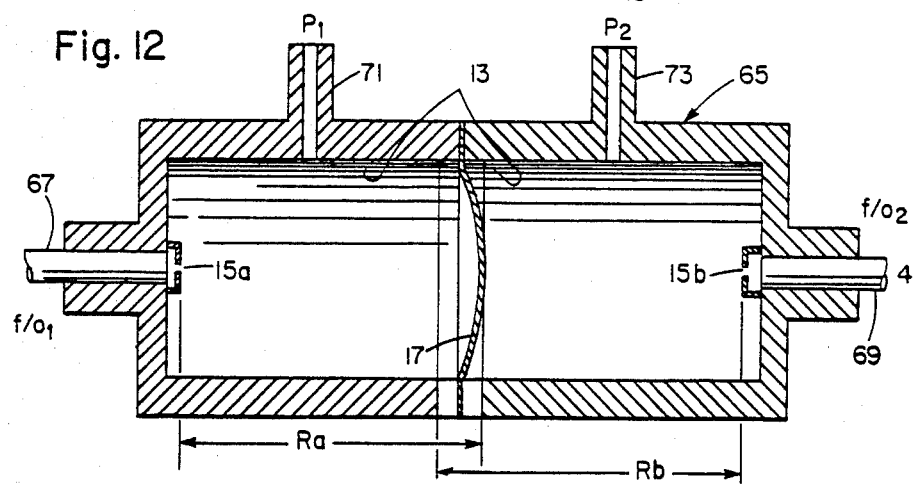

PRESSURE-ACTUATED OPTICAL SWITCH

BACKGROUND OF THE INVENTION

1. Field of the Invention

The invention generally relates to an apparatus for interrupting a light beam in response to the application of a predetermined force and more particularly to an optical switch for use, for example, in fiber optic control circuits as well as fiber optic data transmission lines.

2. Description of the Prior Art

Traditionally, control circuits utilize electrical switches to control relays and other electromechanical devices. These devices are coarse control elements and may be utilized because they are relatively insensitive to contact bounce as well as noise pick-up on associated wiring. Generally, this type of control circuit is too slow for many modern, fast-response systems and subject to failure due to wear, pitting and burning of the electrical contacts.

It is desirable to interface electrical switches with electronic circuits such as microprocessors and to perform power control functions utilizing solid-state relays. Such solid-state electronics eliminate some of the above problems but are still susceptible to contact bounce and noise pick-up problems. Contact bounce can be countered with added anti-bounce circuitry and filtering. Both solutions tend to reduce response speed as well as increase the cost, weight, complexity and size of the overall system.

The noise pick-up problem is of particular concern in many military applications where digital computers are required to operate in the presence of severe electromagnetic pulses. Further, all onboard flight computers in commercial aircraft must be capable of operating in the presence of electrical storms. In industrial applications, computers are required to operate in many noisy environments, as, for example, electrical noise generated by spot welding as well as the opening and closing of electromagnetic relays. The computer can be protected from stray electrical noise by heavily filtering input power lines and adequate shielding of the electronics. However, if a remote keyboard is used to provide input to the computer, the wiring between keyboard and computer can allow stray electrical noise to be picked up in the computer thereby negating the effectiveness of the shielding.

One solution to the problem is to convert the electrical output of a shielded conventional keyboard into an optical output which can be transmitted to the computer by means of fiber optic transmission lines. The fiber optic transmission lines perform the same function as electrical transmission lines; however, they offer distinct advantages since the fiber optic dielectric materials are immune to noise pick-up problems.

An alternative solution to the problem involves utilizing a local keyboard composed of an array of optical switches which directly interface with a computer through fiber optic transmission lines. This solution eliminates the need for electronics within the keyboard, electrical power to the keyboard as well as shielding of the keyboard.

SUMMARY OF THE INVENTION

A general object of the invention is to provide a snap-action switch for optical transmission lines.

Another object of the invention is to provide a snap-action optical transducer for measurements of conditions such as pressure, temperature and fluid level.

Yet another object of the invention is to provide an optical switch capable of a rapid switching action occurring at a predetermined pressure and providing an acceptable degree of hysteresis.

Another object of the present invention is to provide an optical switch which eliminates contact bounce.

Yet another object of the present invention is to provide an optical switch for use with fiber optic control circuits and data transmission lines which are impervious to electrical noise pick-up.

Still another object of the present invention is to provide an optically switched keyboard assembly.

One of the advantages of the present invention is that it provides a simple, highly reliable switching arrangement which is inexpensive to mass produce.

Another advantage of the present invention is that it is capable of miniaturization. Accordingly, it finds application in many areas such as pressure and temperature transducers.

In accordance with the principles of the present invention, a pressure actuated optical switch includes an enclosure having a light absorbing interior and an aperture for transmitting light into the enclosure. A spherical, concave, light-reflective diaphragm is contained within the enclosure so that a substantial amount of light entering through the aperture is reflected by the diaphragm back to the aperture. Any light entering the aperture but failing to strike the diaphragm is absorbed by the interior surface of the enclosure. The diaphragm is adapted to abruptly reverse its curvature upon the application of a predetermined external force so that incoming light is reflected away from the aperture and absorbed within the enclosure. The diaphragm can be astable or bistable and can be operated manually or as a function of fluid pressure or temperature.

The invention is directed toward an optical switch which comprises a diaphragm of resilient material having at least one optically refelective surface, means for supporting the diaphragm for rapid movement between a first and a second state in response to a condition desired to be sensed, means for directing a light beam toward the optically reflective surface of the diaphragm, and means for receiving the light beam after reflection from the diaphragm. The diaphragm is operative in the first state to reflect at least a portion of the light beam to the receiving means and is operative in the second state to reflect the portion of the light beam away from the receiving means. The diaphragm thus provides a rapid switching element for abruptly making and breaking a light path formed by the light beam between the light directing and receiving means.

The optical switch is adaptable for use with a flexible fiber optic transmission line which conveys light from a remote light source to the switch and conveys reflected light from the switch to a remote optical detector. The fiber optic transmission line can comprise a single fiber, a single fiber bundle or a plurality of fiber bundles.

Additionally, a keyboard switch assembly can be fabricated utilizing the above-described optical switch in such a manner that a mirror array is formed in a single stamping operation and fiber optic transmission lines can be finished in a single operation.

BRIEF DESCRIPTION OF THE DRAWINGS

The foregoing and other objects, features and advantages of the invention will be apparent from the following more particular description of preferred embodiments of the invention, as illustrated in the accompanying drawings. The drawings are not necessarily to scale, emphasis instead being placed upon illustrating the principles of the invention.

FIG. 1A is a front planer view of the pressure-actuated optical switch of the present invention;

FIG. 1B is a sectional veiw of the optical switch along line B—B of FIG. 1A;

FIG. 2 is a fractional sectional view of the present invention illustrating a bistable diaphragm arrangement;

FIG. 3 is a fractional, sectional view of the present invention illustrating an astable diaphragm arrangement;

FIG. 4 illustrates the optical properties of the present invention when the diaphragm assumes a concave configuration;

FIG. 5 illustrates the optical properties of the present invention when the diaphragm assumes a convex configuration;

FIG. 6 is a sectional view of the optical switch of the present invention in combination with a flexible fiber optic transmission line including two bundles of fibers;

FIG. 7 is a sectional view of the optical switch of the present invention in combination with a single fiber or single fiber bundle;

FIG. 10 illustrates a differential gas pressure switch in accordance with yet another embodiment of the invention;

FIG. 11 illustrates an alternative embodiment of the present invention wherein the switch is actuated at a specific temperature;

FIG. 12 illustrates a differential pressure switch embodiment of the invention wherein the diaphragm is provided with a reflective surface on both sides thereof;

DETAILED DESCRIPTION OF THE PREFERRED EMBODIMENTS

Figure 8:
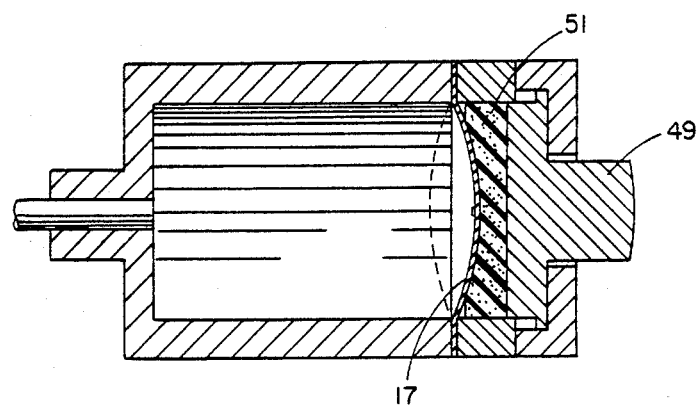
FIG. 8 illustrates a manually-actuated pushbutton optical switch in accordance with an embodiment of the invention.

A pressure-actuated optical switch is illustrated in FIGS. 1A and 1B comprising a housing or enclosure 11 formed from metal or other opaque material, and having a light absorbing interior surface 13. A pin hole or aperture 15 is provided for transmitting light to the interior of the enclosure 11 which contains a spherical, concave diaphram 17. At least the surface of diaphragm 17 which faces aperture 15 is made light-reflective. Most preferably, the aperture 15 and diaphragm 17 are separated by a distance R which is equal, or nearly equal to the radius of curvature of diaphragm 17. The diaphragm 17 is formed from a resilient material which allows it to abruptly reverse its curvature to a convex configuration 19 when subjected to a predetermined external force or pressure P. The pressure required to snap the diaphragm 17 into a convex configuration 19 is determined by the angular extent of the diaphragm, its thickness and the modulus of elasticity of the material from which it is formed.

Depending upon the method of attachment of the diaphragm 17 to the enclosure 11, the diaphragm 17 may be either astable (stable in only one of the concave or the convex state), or bistable (stable in both the concave and the convex states). As illustrated by FIG. 2, the diaphragm 17 is subjected to approximately the same stress in either a concave configuration 23 or a convex configuration 25 to provide a bistable arrangement.

When an applied pressure is removed, the state of the diaphragm 17 will remain unchanged. FIG. 3 illustrates an astable diaphragm configuration wherein the diaphragm 17 has an external, annular flange portion 26 secured into the enclosure 11. Diaphragm 17 is subjected to a greater stress in the convex configuration 27 than in the concave configuration 29. A pressure exerted in the direction of the arrow P will cause the diaphragm to snap into the convex configuration 27. When an applied pressure is removed, the diaphragm 17 will return to the original concave configuration 29.

In reference to FIG. 4, it may be seen that aperture 15 is located at the center of curvature of diaphragm 17. Light rays 31 entering through aperture 15 are incident normal to the surface of diaphragm 17, and thus are reflected back to aperture 15. Substantially all rays not incident upon diaphragm 17 are absorbed by the interior surface 13 of the enclosure 11. When the diaphragm 17 assumes a convex configuration 19, as shown in FIG. 5, incoming light is reflected away from the aperture 15. Only the axial ray 33 is reflected back to the aperture 15. This axial reflection may be eliminated by the absorptive or scattering area 35 located at the center of the diaphragm 17. Area 35 may simply be a thin coating of black paint. Observed from aperture 15, the switch converts from a highly effective reflector to a near-perfect absorber as the diaphragm 17 changes from a concave to a convex configuration.

A light source, such as a LED, and a photodetector, such as a PIN photodiode, can be colocated within the aperture 15 and in the plane of the aperture 15 so that light from the source is either absorbed or reflected back to the photodetector depending upon the configuration of the diaphragm. Since the photodetector is conductive when illuminated and non-conductive when dark, this combination constitutes a pressure-actuated contactless electrical switch. Although the subject switch is useful in this configuration, the preferred embodiment includes a remotely located light source and photodetector in combination with fiber optics as shown in FIGS. 6 and 7.

Referring to FIG. 6, a flexible fiber optic transmission line 39 has one end attached to the enclosure 11 via a coupling means 40. The transmission line 39 has a first light transmissive fiber path for conveying light from a light source 41 to the enclosure 11 and a second light transmissive fiber path for conveying reflected light from the diaphragm 17 to a light detector 43. FIG. 7 illustrates an alternative embodiment wherein a single fiber or single bundle of fibers 45 or a single fiber rod conveys light from the light source 41 to the enclosure 11 as well as conveying reflected light from the diaphragm to the detector 43. The remote end of the fiber 45 interfaces with a directional coupler 47 which allows light from the light source 41 to be directed into the fiber 45 as well as directing reflected light from the enclosure 11 to the detector 43.

It is noted that the detector 43 may be a photodiode which is connected in a suitable circuit to generate a pulse, voltage or signal upon the snapaction of the diaphragm. Numerous such electronic circuits are well known in the art. It is also indicated, however, that the detector itself may be eliminated, and the output fiber rod or bundle may itself provide a visual indication to an operator of the pressure, temperature or mechanical condition to be sensed. Idiot lights for automobiles are one such application.

A transparent window, not shown, can be installed in the switch at the point of entry of the fiber optics to ensure a hermetic seal. For the highest possible on/off ratio, such a window should have an anti-reflective coating. Further, the optical path between the fiber optics and the diaphragm 17 can include a lens or lens system for physically shortening the length of the switch as illustrated by element 46 in FIG. 6. Additionally, the enclosure may contain mirrors or prisms to bend the optical path permitting the optical transmission line to enter through the side, rather than through the rear, of the switch. Such an arrangement is illustrated by the mirror 48 and lens 50 shown in dotted lines in FIG. 7. It is also contemplated that optical configurations may be implemented wherein light enters the switch enclosure 11 through one side and exits through another, different side implemented, for example, with a beam splitter. For the highest possible on/off ratio, mirrors or prisms should also include anti-reflective coatings. The fiber optics can be permanently connected to the switch or removably connected utilizing well known connector arrangements.

Figure 9:
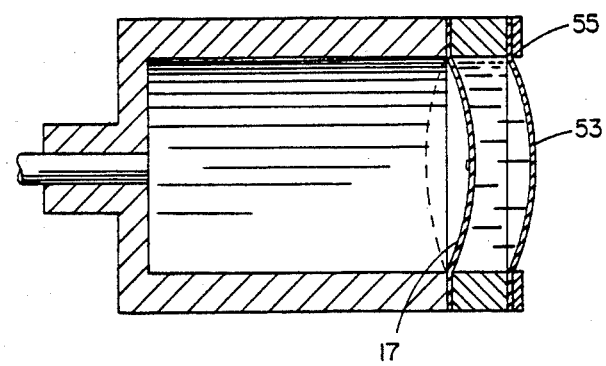
FIG. 9 illustrates the use of a fluid-like material providing a resilient member between a push button and the diaphragm in accordance with another embodiment of the invention.

One possible configuration for a manually-actuated push-button optical switch is illustrated in FIG. 8. In this configuration the diaphragm 17 is astable similar to that shown in FIG. 3. The motion of a push-button actuator 49 is converted into a pressure which is applied to the diaphragm 17 by including a pad 51 of soft, resilient material such as foam rubber. The pad 51 and actuator 49 may also take the form of a single fluid filled diaphragm or container 53 containing a fluid, fluid-like material or gas 55 as illustrated in FIG. 9.

Yet another embodiment of the present invention is illustrated in FIG. 10 wherein the diaphragm 11 hermetically divides the enclosure 11 into separate areas or chambers 61 and 63. A differential gas pressure switch is provided by subjecting the diaphragm 17 to a first pressure P1 applied through a fitting 57 into chamber 63 and a second pressure P2 applied through a fitting 59 into chamber 61. This arrangement produces switching at a predetermined differential pressure. The fluid pressure may alternately be applied within one or both of chambers 61 and 63.

A temperature-actuated switch is illustrated in FIG. 11 wherein a diaphragm 18 comprises a bimetallic element formed with two bonded layers of material having different temperature coefficients of expansion. The surface of diaphragm 18 which is adapted to receive the incoming light is either naturally light reflective because of the metal selected, or may be made light reflective by application of a thin coating of light-reflective material. Thermally induced stress causes the diaphragm 17 to snap from a concave configuration to a convex configuration at a predetermined temperature. The diaphragm may be mounted as in FIG. 2 to provide a bistable switch such that two substantially different temperatures will provide the snap-action, i.e. concave to convex for one temperature, and convex to concave for the other temperature. However, if the diaphragm 18 is mounted as in FIG. 3 for astable operation, the temperature change necessary to cause the diaphragm to snap back to the concave shape will be substantially less than in the bistable case. The various temperatures desired to be sensed may be selected by appropriately choosing the size, thickness and type of metals. In yet another embodiment switching with temperature can be accomplished utilizing the bimetalic diaphragm 18 within the switching arrangement illustrated in FIG. 10. In this case, the left-hand compartment 61 and the right-hand compartment 63 are filled with liquids or gases of different temperatures or of different thermal expansion coefficients. One may also utilize a pressure differential so that the switch is responsive to a combination of thermal and pressure differentials between the two chambers 61 and 63.

Yet another embodiment of the present invention is illustrated in FIG. 12 wherein a differential pressure switch 65 includes a pair of fiber optic transmission lines 67 and 69. A first pressure P1 is applied to one side of the diaphragm 17 via fitting 71 and a second pressure P2 is applied to the other side of the diaphragm 17 via fitting 73. Both sides of the diaphragm 17 are made optically reflective so that one optical output is "on" while the other is "off". Pin-holes 15a and 15b are provided at a distance at or near the respective curvature radii Ra and Rb of the diaphragm 17. Typically Ra is equal to Rb but not necessarily so, particularly if the bimetallic diaphragm 18 is utilized. In this case, switch 65 may be a temperature switch or a combination temperature/pressure switch as discussed in relation to FIG. 10.

Figure 13:
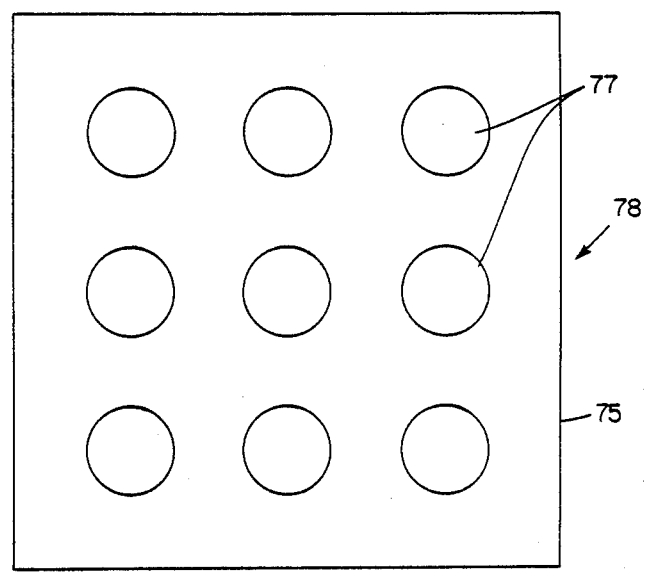
FIG. 13 is a planer view of a mirror array used in an optical keyboard switching assembly of the present invention.
Figure 14:
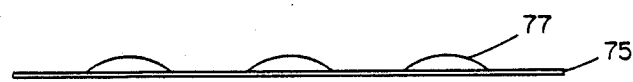
FIG. 14 is a side view of the mirror array pictured in FIG. 13.
Figure 15:
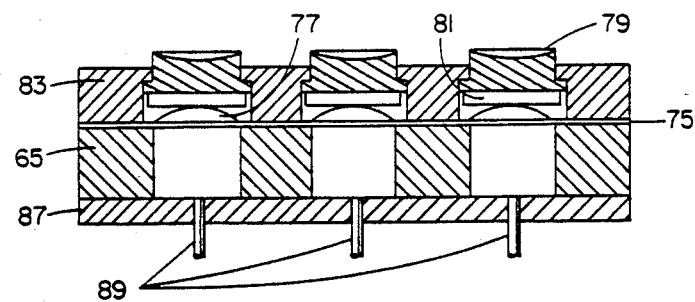
FIG. 15 is a sectional view of the optical keyboard assembly of the present invention.

A keyboard switch assembly can be constructed utilizing an array of astable pressure-actuated optical switches to directly interface with a computer through fiber optic transmission lines. Such a keyboard is illustrated in FIGS. 13–15. The keyboard may be fabricated utilizing a single sheet of resilient material 75 having spherical diaphragms 77 stamped thereon to form a diaphragm array 78. The keyboard comprises push buttons 79, resilient pads 81, a top plate 83, a center plate 85, and a bottom plate 87. The bottom plate secures the fiber optic transmission lines 89. The sheet 75 containing the diaphragms 77 is positioned between the top plate 83 and center plate 85. The only part of the optical keyboard which requires a reasonable amount of precision is the diaphragm array 78 which can be formed in a single stamping operation. Additionally, the fiber optic transmission lines 89 can be finished in a single operation since all the lines 89 lie in the same plane.

Figure 16:
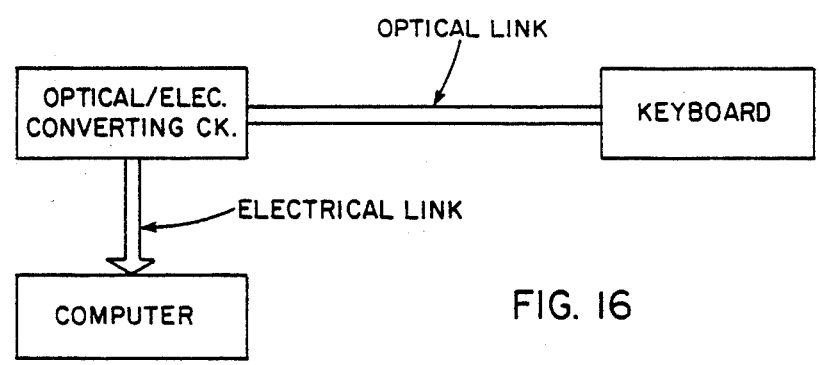
FIG. 16 is a block diagram of the optical keyboard in combination with an optical/electrical converting means and a computer of other electrical interface.

The optical keyboard may be utilized for providing input signals to an electrical device such as a computer by means of an optical-to-electrical converting circuit as illustrated generally in FIG. 16. Fiber optic transmission lines interconnect the keyboard with the converting circuit which also contains the light source for illuminating the diaphragms. The converting circuit may comprise the PIN photodiode as discussed in relation to the light detector 43 of FIGS. 6 and 7.

Figure 17:
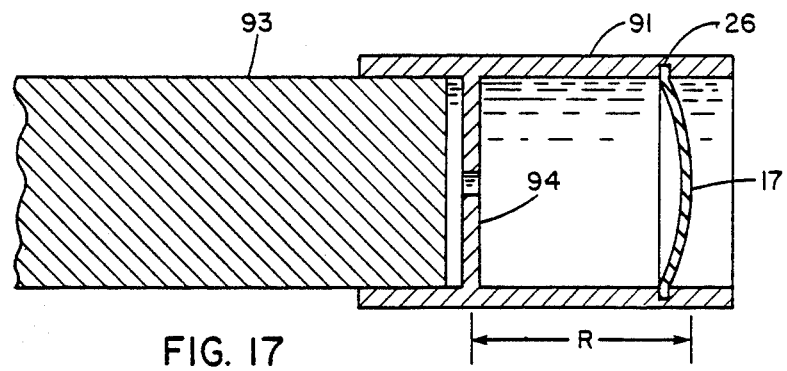
FIG. 17 is a cross-sectional view of yet another embodiment of the invention wherein the diameter of the diaphragm is on the same order of magnitude as the optic transmission line.
Figure 18:
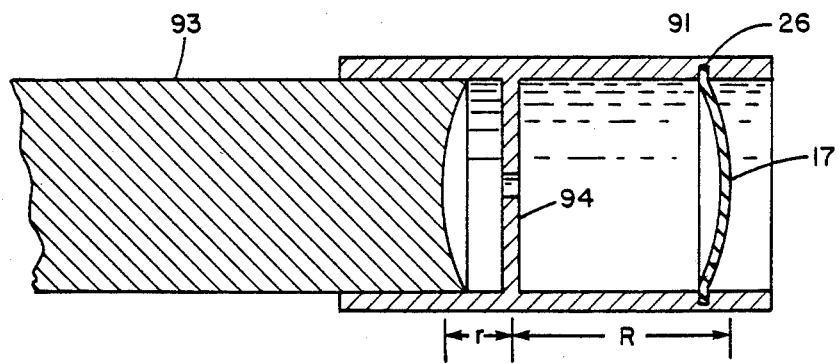
FIG. 18 is a cross-sectional view of another embodiment of the invention similar to that of FIG. 17.
Figure 19A:
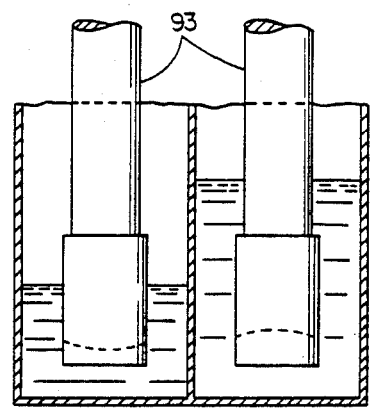
FIGS. 19A, 19B and 20 illustrate different applications of the optical switch in accordance with the teachings of the invention.
Figure 19B:
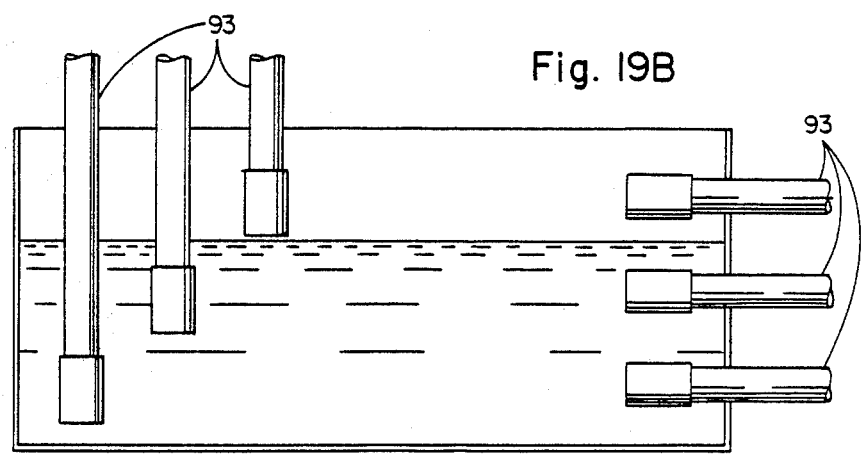

In yet another embodiment of the invention the size of the diaphragm is fabricated to be on the same order of magnitude as the diameter of a single fiber optic line or rod. As shown in FIG. 17, a sleeve 91 is secured about a fiber rod 93. An aperture plate 94 and diaphragm 17 are secured within the sleeve 91. The aperture plate 94 may be omitted particularly if the threshold level of the downstream light detecting circuitry is set low. The fiber rod 93 may be a self-focusing fiber to help concentrate the light through the aperture plate and onto the diaphragm. In an alternate arrangement as shown in FIG. 18, the end of the fiber rod is of spherical configuration to act as a lens for concentrating light from the fiber rod toward the slit in the aperture plate 94. The aperture plate 94 is located at distances r and R as illustrated wherein the distance r corresponding to the radius of curvature of the rod 93 and a distance R corresponding to the radius of curvature of diaphragm 17. The diaphragm 17 responds by its snap-action to a condition desired to be sensed, such as, for example, a fluid pressure (gas or liquid) or the presence of an external force provided by mechanical means (as in limit switches) or manual means. In one application as illustrated in FIGS. 19A and 19B one or a plurality of such switches may be utilized as fluid level transducers wherein a predetermined pressure resulting from fluid above the level of the diaphragm causes the snap-action of the diaphragm. The diaphragm is preferably of the astable type as shown in FIG. 3.

Figure 20:
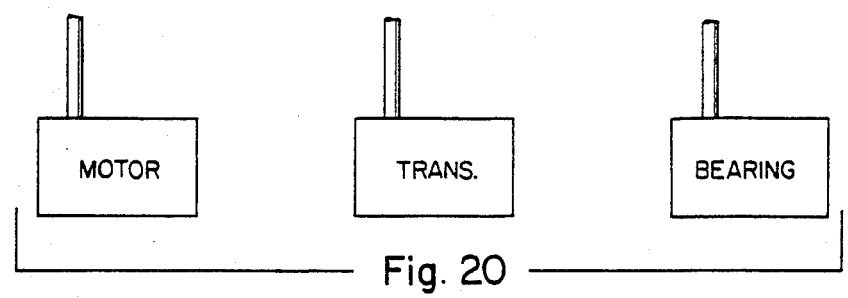

In yet another embodiment, the diaphragm 17 is replaced by the bimetallic diaphragm 18 of FIG. 11 so that the switch is operative as a small temperature transducer. In such an embodiment the invention may be utilized as indicated in FIG. 20 to measure temperature conditions and indicate overheating in transformer windings, motors, bearings and other engine parts and devices. An array of such switches, designed for snap-action at different temperatures may be used for an incremental temperature sensor.

In still other applications, the switch, such as illustrated in FIG. 8, may be used to determine mechanical closures such as for doors, landing gears of aircraft and many limit switch-type applications. For keyboards as is illustrated in FIGS. 15 and 16, the switches may be used as control or keyboard inputs to computers to provide interference-free keyboard function switches in aircraft and the like. Such uses are particularly important for providing optical links to control computers for preventing spurious signal pick-up during electrical storms.

While the invention has been particularly shown and described with reference to preferred embodiments thereof, it is understood by those skilled in the art that various changes in form and detail can be made without departing from the spirit and scope of the invention. For example, a multiplicity of the switches of the present invention can be sampled and time-division multiplexed. The switches may be easily ganged to perform multi-pole and multi-position functions. Additionally, unlike an electrical switch, power and current-handling capabilities are not considerations in the optical switch. Proper operation of the optical switch requires that only geometric considerations be satisfied. Therefore, the physical size of the switch can be scaled to fit the intended application. Further, the diaphragm may be made into an elliptical shape or even a flat shape wherein lens arrangements are utilized to concentrate the light toward the light receiving means in one state of the diaphragm.

The embodiments of the invention which in exclusive property, right or privilege is claimed is defined by the following claims:

What is claimed is:

1. An optical switching element comprising:
   (a) a diaphragm of resilient material, said diaphragm having at least one optically reflective surface,
   (b) means for supporting said diaphragm for rapid snap-action movement between a spherical concave state and a spherical convex state in response to a condition desired to be sensed,
   (c) means for directing a light beam toward said at least one optically reflective surface of said diaphragm, said directing means including a member having an aperture therein through which said light beam passes, said aperture positioned a distance away from said diaphragm equal to the radius of curvature of said diaphragm,
   (d) means for receiving said light beam after reflection from said diaphragm,
   (e) said diaphragm operative in said concave state to reflect at least a portion of said light beam to said receiving means, and
   (f) said diaphragm operative in said convex state to reflect said portion of said light beam away from said receiving means,
   whereby said diaphragm provides a rapid switching element for abruptly making and breaking a light path formed by said light beam between said light directing and receiving means.

2. An optical switching element as recited in claim 1 wherein said directing means includes a light generating device having at least a portion thereof located within said aperture.

3. An optical switching element as recited in claim 1 wherein said supporting means and said diaphragm cooperate for biasing said diaphragm into said concave state.

4. An optical switching element as recited in claim 1 wherein said diaphragm comprises a bimetallic element and said sensed condition is a temperature condition.

5. An optical switching element as recited in claim 1 further comprising an enclosure having said member as a part thereof, said diaphragm having said at least one optically reflective surface within said enclosure and having its optical reflective surface positioned to receive said light beam entering said enclosure from said aperture and said enclosure having means for exposing said diaphragm on a surface opposite said light reflecting surface to said condition desired to be sensed.

6. An optical switching element as recited in claim 5 wherein said condition is a pressure condition.

7. An optical switching element as recited in claim 5 wherein said condition is a mechanical position.

8. An optical switching element as recited in claim 2 wherein said receiving means includes a photodetector at least a portion of which is located within said aperture.

9. An optical switching element as recited in claim 5 wherein said diaphragm substantially divides said enclosure into two portions, a first portion including said aperture and optically reflective surface of said diaphragm and a second portion including said opposite surface of said diaphragm.

10. An optical switching element as recited in claim 9 wherein said first and second portions are hermetically separated by means including said diaphragm.

11. An optical switching element as recited in claim 10 wherein said enclosure has a port positioned in said first portion of said enclosure whereby said diaphragm moves between said concave and convex states in response to pressure differentials between said first and second portions of said enclosure.

12. An optical switching element as recited in claim 11 wherein said second portion has another aperture therethrough for permitting another light beam to enter therein, said opposite surface of said diaphragm also being light reflective and positioned a distance away from said another aperture equal to the radius of curvature of said diaphragm, and said means for exposing said diaphragm comprises another port wherein said diaphragm operates to reflect light toward said first aperture and away from said second aperture and vice versa.

13. An optical switch comprising:
(a) a spherical diaphragm having a light reflecting surface,
(b) means for supporting said diaphragm for snap-action movement between a first, concave shape and a second, convex shape in response to one of a pressure and temperature condition desired to be sensed,
(c) a housing for at least partially shielding the light reflecting surface of said diaphragm,
(d) said housing having an aperture spaced from said diaphragm by a distance substantially equal to the radius of curvature of said diaphragm, and
(e) means for transmitting light through said aperture and onto said light reflecting surface and for transmitting light reflected from said diaphragm in said concave shape, again through said aperture and to the exterior of said housing, whereby, in said first shape, the reflecting surface of said diaphragm reflects light toward said light transmitting means and, in said second shape, the reflecting surface of said diaphragm reflects light away from said light transmitting means.

14. An optical switch as recited in claim 13 wherein said supporting means and said diaphragm cooperate for biasing said diaphragm into said first shape.

15. An optical switch as recited in claim 13 wherein said diaphragm changes from said first shape to said second shape in response to said sensed condition and remains in said second shape after termination of said sensed condition.

16. An optical switch as recited in claim 13 wherein said diaphragm changes from said first shape to said second shape in response to said sensed condition and reverts to said first shape after termination of said sensed condition.

17. An optical switch as recited in claim 13 wherein said housing includes said light reflecting diaphragm surface as an inner wall thereof.

18. An optical switch as recited in claim 13 wherein said light transmitting means further comprises an optical transmission line positioned within said aperture.

19. An optical switch as recited in claim 13 wherein said light transmitting means comprises a first optical transmission line for transmitting light onto said diaphragm and a second optical transmission line for transmitting reflected light from said diaphragm to the exterior of said housing.

20. An optical switch as recited in claim 18 wherein said light reflecting surface of said diaphragm forms an inner surface of said housing and said diaphragm has a generally circular peripheral edge of approximately the same diameter as the diameter of said optical transmission line.

21. An optical switch as recited in claim 20 wherein said optical transmission line comprises a single optical fiber.

22. An optical switch as recited in claim 13 or 18 wherein said sensed condition is a pressure condition.

23. An optical switch as recited in claim 13 or 18 wherein said sensed condition is a temperature condition.

24. An optical switch as recited in claim 22 wherein said pressure condition arises from a manual force communicated to said diaphragm.

25. An optical switch as recited in claim 13 wherein said reflective surface of said diaphragm has a non-reflective central region, said central region absorbing light when said diaphragm is in said concave and convex shapes.

26. An optical switch as recited in claim 23 wherein said diaphragm comprises a bimetallic element.

27. An optical switching element comprising:
(a) a diaphragm of resilient material, said diaphragm having at least one optically reflective surface,
(b) means for supporting said diaphragm for rapid snap-action movement between a spherical concave state and a spherical convex state in response to a condition desired to be sensed,
(c) a light source positioned at a distance away from said diaphragm equal to the radius of curvature of said diaphragm, said light source generating light toward said diaphragm,
(d) a receiver for receiving light reflected from said diaphragm,
(e) said diaphragm operative in said concave state to reflect substantially all of said light to said receiver, and
(f) said diaphragm operative in said convex state to reflect substantially all of said light away from said receiver, whereby said diaphragm provides a rapid switching element for abruptly making and breaking a light path formed by said light between said light source and receiver.

28. An optical switching element as recited in claim 27 wherein said receiver is positioned adjacent said light source.

29. A push-button optical switch comprising:
(a) a diaphragm having a light reflecting surface,
(b) means for securing said diaphragm for snapaction movement from a first shape to a second shape in response to a manual force, and for automatically returning said diaphragm from said second shape to said first shape upon termination of said force, one of said first and second shapes being spherical convex and the other of said first and second shapes being spherical concave, (c) a push-button element for communicating said force to said diaphragm, (d) means for directing a light beam toward said diaphragm, said directing means including a member having an aperture therein through which said light beam passes, said aperture positioned a distance away from said diaphragm equal to the radius of curvature of said diaphragm, (e) means for receiving at least a portion of said light beam reflected from said diaphragm, (f) said diaphragm operative in said concave shape to reflect said portion of said light beam toward said receiving means, and (g) said diaphragm operative in said convex shape for directing said portion of said light beam away from said receiving means.

30. An optical switch comprising:
a light source;
a light detector;
a flexible light transmission line;
a housing attached to one end of said transmission line;
a spherical, concave light-reflective diaphragm contained within said housing;
said light transmission line conveying light from said light source into said housing and conveying reflected light from said diaphragm to said detector said end of said transmission line positioned a distance away from said diaphragm equal to the radius of curvature of said diaphragm; and
said diaphragm abruptly reversing its curvature to have a convex shape in response to the application of a predetermined force transmitted to said diaphragm so that a major portion of light conveyed by said transmission line to said diaphragm is reflected by said diaphragm away from said transmission line and absorbed within said housing.

31. An optical switching keyboard comprising:
(1) a plurality of push-button optical switches, each optical switch including:
  (a) a diaphragm having a light reflecting surface,
  (b) means for securing said diaphragm for snapaction movement from a first shape to a second shape in response to a manual force, and for automatically returning said diaphragm from said second shape to said first shape upon termination of said force, one of said first and second shapes being spherical convex and the other of said first and second shapes being spherical concave,
  (c) a push-button element for communicating said force to said diaphragm,
  (d) means for directing a light beam toward said diaphragm, said directing means including a member having an aperture therein through which said light beam passes, said aperture positioned a distance away from said diaphragm equal to the radius of curvature of said diaphragm,
  (e) means for receiving at least a portion of said light beam reflected from said diaphragm,
  (f) said diaphragm operative in said convex shape to reflect said portion of said light beam toward said receiving means, and
  (g) said diaphragm operative in said convex shape for directing said portion of said light beam away from said receiving means,
(2) at least some of said plurality of switches having diaphragms fabricated from a single sheet of resilient and optically-reflective material.

32. An optical switching keyboard as recited in claim 31 wherein said light receiving means comprises means for converting said received, reflected light into an electrical signal.

33. An optical switching keyboard as recited in claim 31 wherein said light receiving means comprises optical transmission lines.

34. An optical switching keyboard as recited in claim 33 wherein said optical transmission lines are optical fibers.

35. An optical switching keyboard as recited in claim 31 or 32 wherein said first shape is said spherical concave shape and said second shape is said spherical convex shape.

36. A pressure-actuated optical switch comprising an enclosure having a light absorbing interior surface; first and second aperatures at either end of said enclosure for transmitting light to said enclosure; a spherical diaphragm having light reflective surfaces located within said enclosure so that substantially all light entering said first aperture is reflected by said diaphragm back to said first aperture and substantially all light entering said second aperture is absorbed within said enclosure; said first and second apertures positioned at a distance away from said diaphragm equal to the radius of curvature of said diaphragm; and said diaphragm abruptly reversing its curvature in snap-action fashion in response to the application of predetermined external force so that substantially all light entering said first aperture is absorbed within said enclosure and a substantial amount of light entering said second aperture is reflected by said diaphragm back to said second aperture.

* * * * *